United States Patent [19]

Huang

[11] Patent Number: 5,893,311

[45] Date of Patent: Apr. 13, 1999

[54] PROTECTIVE COVERS OF POWER SAW

[76] Inventor: Peter Huang, No. 3-6, Lane 989, Chung San Rd., Shen Kang Hsiang, Taichung, Taiwan

[21] Appl. No.: 08/837,947

[22] Filed: Apr. 28, 1997

[51] Int. Cl.[6] ............................................. B27G 19/04
[52] U.S. Cl. ........................ 83/397; 83/478; 83/490; 83/544
[58] Field of Search .......................... 83/397, 478, 544, 83/546, 490, DIG. 1; 30/391

[56] References Cited

U.S. PATENT DOCUMENTS

| | | | |
|---|---|---|---|
| 2,926,709 | 3/1960 | Kaley | 83/544 X |
| 3,913,437 | 10/1975 | Speer et al. | 83/397 X |
| 3,965,787 | 6/1976 | Plischke | 83/544 X |
| 4,028,975 | 6/1977 | Bennett | 83/397 |
| 4,581,966 | 4/1986 | Kaiser et al. | 83/397 |
| 5,020,406 | 6/1991 | Sasaki et al. | 83/397 |
| 5,353,670 | 10/1994 | Metzger, Jr. | 83/478 X |
| 5,370,025 | 12/1994 | Itzov | 83/478 X |
| 5,638,731 | 6/1997 | Garuglieri | 83/397 |

FOREIGN PATENT DOCUMENTS 31 19 573   12/1982   Germany ...................... 83/397

*Primary Examiner*—Clark F. Dexter

[57] ABSTRACT

A power saw is provided with a mechanism for shielding the circular saw blade of the power saw. The shielding mechanism is composed of a first shield, a second and third shield rotatable relative to said first shield, a pivot, a master connection rod, and a slave connection rod. The master connection rod is fastened with the pivot and second shield while the slave connection rod is fastened with third shield and the master connection. The second shield and third shield can be extracted to shield the circular saw blade of the power saw at such time when the circular saw blade is moved away from the work piece. The second shield and third movable shield are retracted to expose the circular saw blade at such time when the circular saw blade is moved toward the work piece.

5 Claims, 4 Drawing Sheets

PROTECTIVE COVERS OF POWER SAW

FIELD OF THE INVENTION

The present invention relates generally to a power saw, and more particularly to a power saw having an improved mechanism for operating the protective cover of the power saw.

BACKGROUND OF THE INVENTION

The conventional power saws are generally provided with a movable protective cover, which is operated by a device consisting of a connection rod provided with a slide slot, and of an eccentric wheel or cam.

Such a prior art device as described above is generally defective in design in that it is exposed and unprotected, and that it undermines the aesthetic effect of the power saw, and further that it is vulnerable to damage caused by the external force, and still further that the moving locus curves of the moving parts of the device is susceptible to distortion caused by the mechanical wear of the moving parts of the device.

SUMMARY OF THE INVENTION

The primary objective of the present invention is to provide a power saw with an improved protective cover which is free from the mechanical drawbacks of the prior art protective cover of the power saw.

In keeping with the principle of the present invention, the foregoing objective of the present invention is attained by an improved power saw, which is composed of a base, a clamping mechanism mounted on the base for holding a work piece, a first pivot mechanism mounted on the base such that the first pivot is fastened pivotally with a cutting mechanism consisting of a motor, a circular saw blade, a first shield, and a handle. The power saw of the present invention is further composed of a second rotatable shield of a sectoral shape, a third rotatable shield of a sectoral shape, a master connection rod, and a slave connection rod. The second shield and the third shield are rotatably mounted coaxially on a shaft on which the circular saw blade is mounted. The master connection rod is connected at one end thereof with a connection point of the second shield, and at another end thereof with the base. The slave connection rod is connected at one end thereof with the master connection rod and at another end thereof with a connection point of the third shield.

The foregoing objective, features and functions of the present invention will be more readily understood upon a thoughtful deliberation of the embodiment of the present invention with reference to the accompanying drawings.

DETAILED DESCRIPTION OF THE INVENTION

Figure 1:
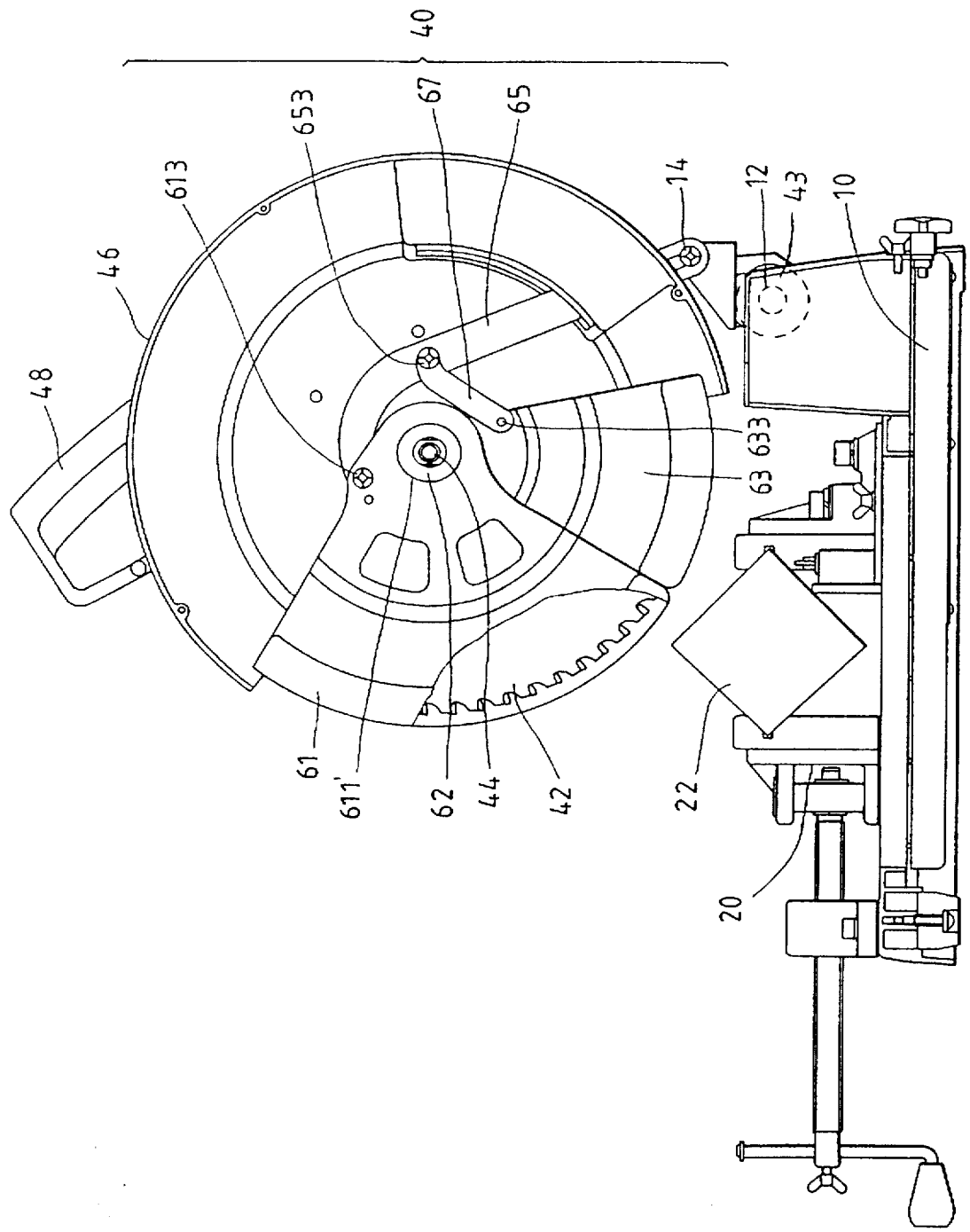
FIG. 1 shows a side schematic view of the present invention at work.
Figure 2:
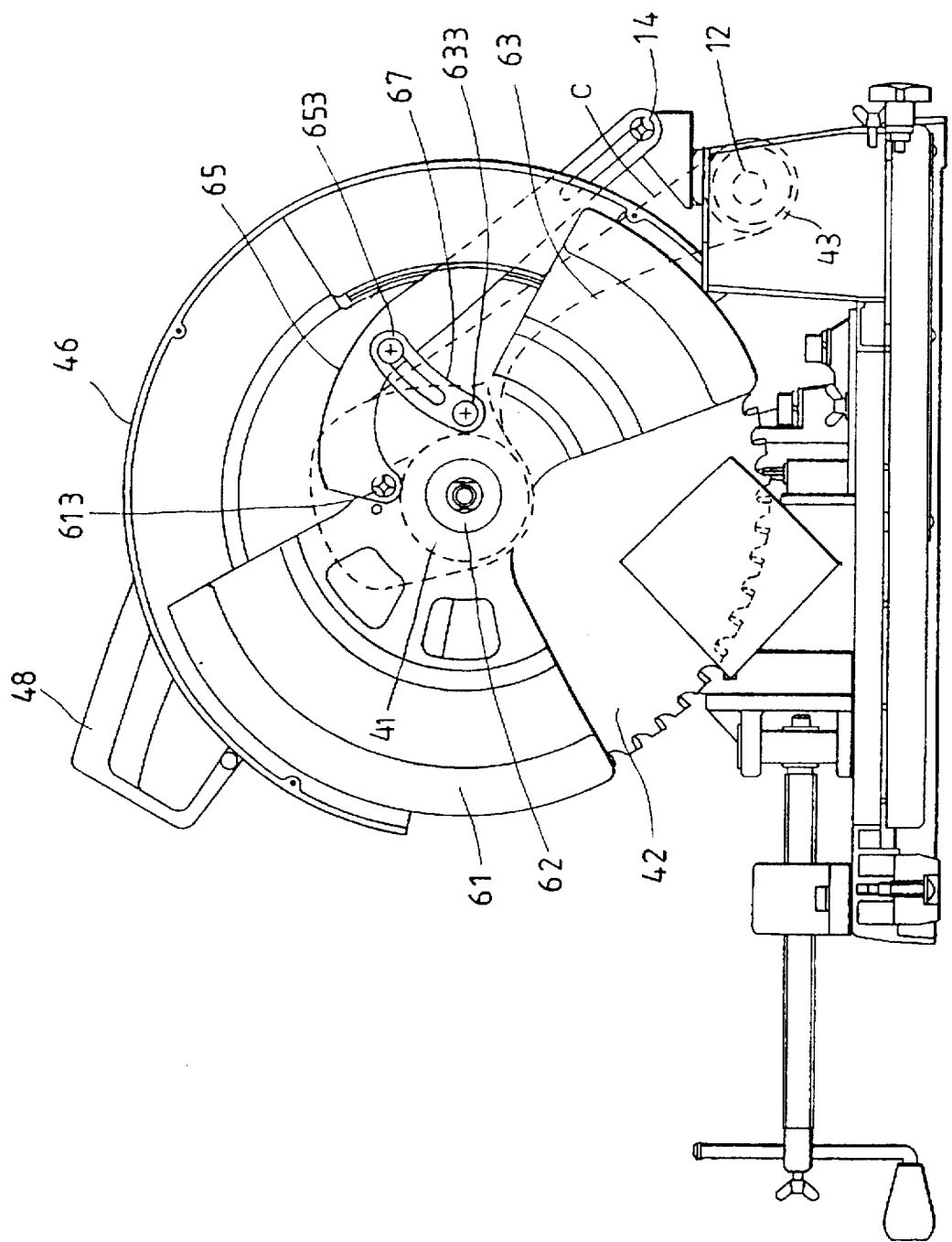
FIG. 2 shows another side schematic view of the present invention at work.
Figure 3:
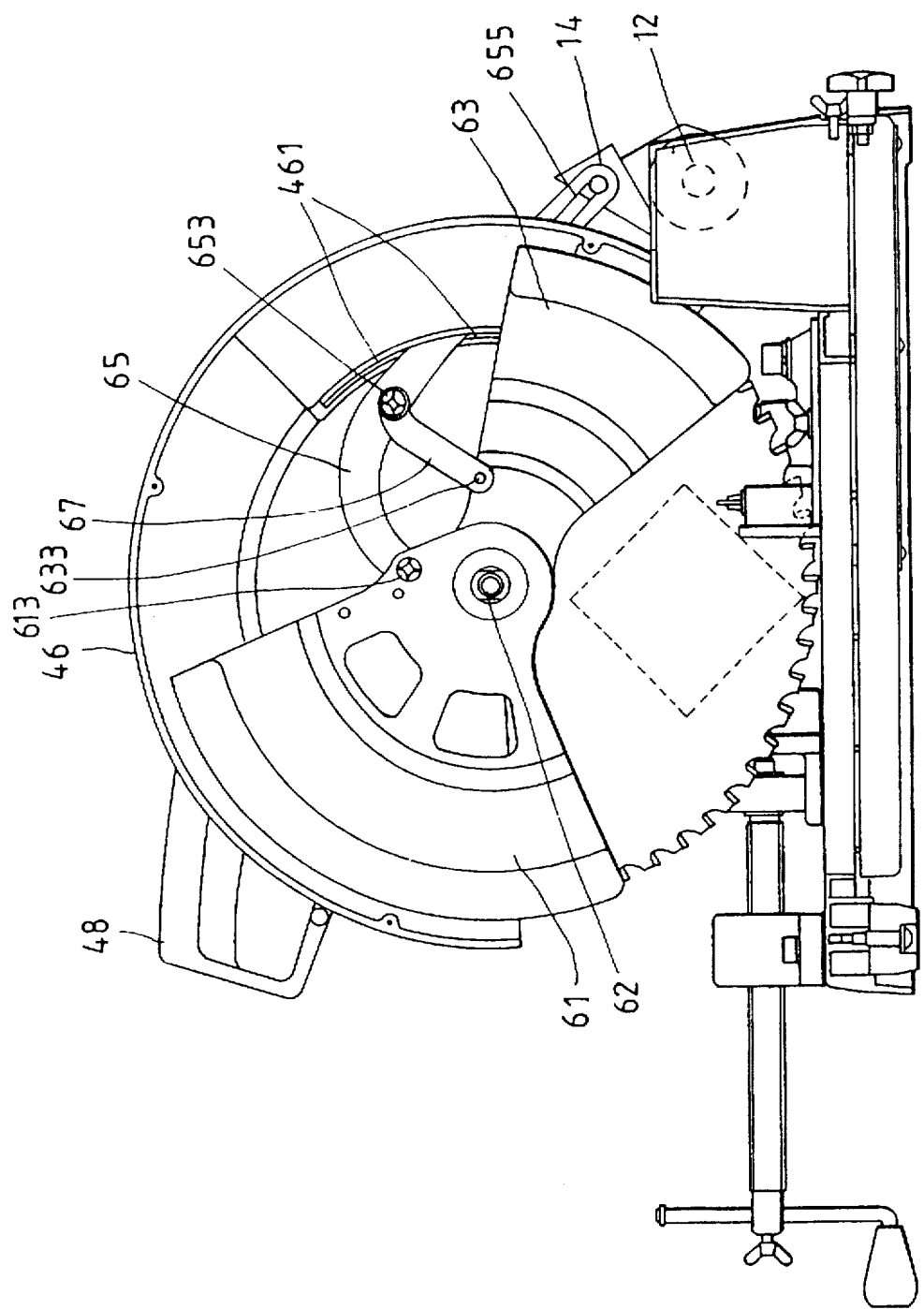
FIG. 3 shows still another side schematic view of the present invention at work.

As shown in FIGS. 1–3, a power saw embodiment in the present invention is composed of the component parts which are described explicitly hereinafter.

A base 10 can be supported on a platform securely to facilitate the cutting of a work piece 22.

A clamping mechanism 20 is mounted securely on the base 10 for holding the work piece 22.

A first pivot 12 is mounted on one end of the base 10 such that the first pivot 12 is farther from the saw operator than the clamping mechanism, and that the first pivot 12 is fitted into a coil spring 43.

A master connection rod 65 is fastened pivotally with an extension of the base 10 as explained further below.

A motor 41 is pivotally supported on the base 10 by an arm C, and the first shield 46 is fixed to the motor 41.

A circular saw blade 42 is mounted on the output shaft 44 of the motor 41.

First shield 46 is mounted such that the shield 46 is adjacent to an upper half of the circular saw blade 42.

A handle 48 is fastened with the first shield 46 to facilitate the cutting operation of the work piece 22.

A second shield 61 is rotatable relative to first shield 46 and is sectoral in shape and is provided with a pivoting hole 611 located on the center line extending from the sectoral center point toward the circle center. The second shield 61 is rotatably and coaxially mounted with the circular saw blade 42 on a motor shaft 44 such that the pivoting hole 611 is rotatably engaged on shaft 44 by the retaining bolt 62. The second shield 61 is provided with a connection point 613 spaced above the upper side of the pivoting hole 611 when not in use.

A third shield 63 is rotatable relative to first shield 46 and is sectoral in shape and is provided with a pivoting hole 611' located on the center line extending from the sectoral center point toward the circle center. The third shield 63 is rotatably and coaxially mounted with the second shield 61 and the circular saw blade 42 on shaft 44. The third shield 63 is provided with a connection point 633 spaced below the lower side of the pivoting hole 611 when not in use.

A master connection rod 65 is pivotally fastened at one end thereof with a second pivot 14 located on the extension of the base 10, and at another end thereof rotatably with the connection point 613 of the second shield 61. The master connection rod 65 is provided with a connection point 653 located at a midpoint thereof such that the connection point 653 is located below the connection point 613 of the second shield 61.

A slave connection rod 67 is fastened pivotally at one end thereof with the connection point 633 of the third shield 63, and at another end thereof with the connection point 653 of the master connection rod 65.

The circular saw blade 42 is completely covered by the fixed shield 46, the second shield 61 and the third shield 63. As the handle 48 is pressed to lower the power saw of the present invention, the first shield 46 is caused to pivot downwards around the first pivot 12 as the slot 655 remains pivotally fixed against the second pivot 14. In the meantime, the second shield 61 and the third shield 63 are caused respectively by the tractions of the master connection rod 65 and the slave connection rod 67 to rotate relative to the first shield 46 and retract into the first shield 46 so as to expose the circular saw blade 42. As shown in FIG. 3, the fixed shield 46 is provided with a slot 461 through which the master connection rod 65 slides.

Figure 4:
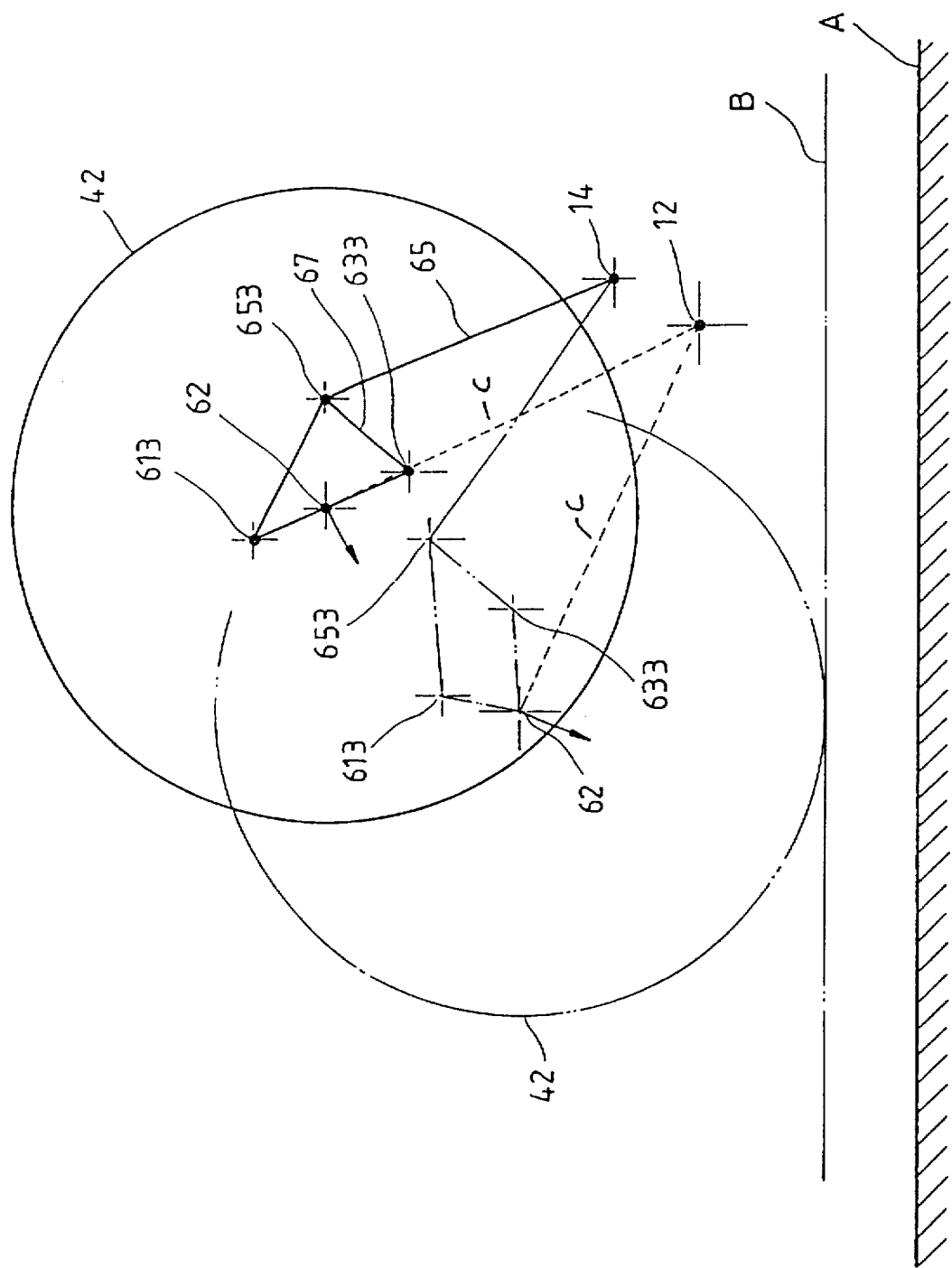
FIG. 4 shows a schematic view of the connection rod in motion according to the embodiment of the present invention.

The master connection rod 65 is provided with the slide slot 655 engaged to the second pivot 14 of the base 10. The slide slot 655 is intended to permit adjustment of the pivoting radius of the master connection rod 65. As shown in FIG. 4, during operation of the saw the slot 655 is pivotally fixed against the second pivot 14 so that the connection rod 65 pivots around the second pivot 14. As a result, the positions of the second shield 61 and the third shield 63 can be so adjusted as to prevent the second shield 61 and the third shield 63 from obstructing a thick work piece held by the clamping mechanism 20.

As further illustrated in FIG. 4, the ground surface is designated by the line A while the cutting line is designated by the imaginary line B. As the power saw is started, the retaining bolt 62 and shaft 44 begin to undergo an arcuate motion on arm C indicated by the arrow, with the first pivot 12 serving as the circle center for arm C. In view of the traction forces of the master connection rod 65 and the slave connection rod 67, the connection points 613 and 633 move upwards in relation to the retaining bolt 62, thereby enabling the second shield 61 and the third shield 63 to open up so as to expose the circular saw blade 42 for working on the workpiece 22. As the first shield 46 resumes moving back up away from the base 10 to cause the circular saw blade 42 to disengage the workpiece 22, the second shield 61 and the third shield 63 return to remain in the state of covering completely the circular saw blade 42 to safeguard the operator. The rotatable second and third shields 61 and 63 are simple in construction and operated by a relatively simple connection rod mechanism.

The power saw of the present invention is characterized in design in that it is provided with a mechanism for shielding the circular saw blade 42 so as to safeguard a person operating the power saw. The shielding mechanism consists of the first shield 46, the second shield 61, the third shield 63, the master connection rod 65, the slave connection rod 67, and the second pivot 14.

The embodiment of the present invention described above is to be deemed in all respects as being merely illustrative and not restrictive. Accordingly, the present invention may be embodiment in the other specific forms without deviating from the spirit thereof. For example, the second shield 61 and the third shield 63 of the present invention may have a radius greater than that of the first shield 46. In addition, the second shield 61 and the third shield 63 may be retracted to embrace the fixed shield 46. The present invention is therefore to be limited only by the scopes of the following appended claims.

What is claimed is:

1. A power saw comprising:

a base;

a clamping mechanism mounted on said base for holding a workpiece;

a first pivot mounted on said base such that said first pivot is provided with a biasing means fitted thereover;

said first pivot fastened pivotally with a motor;

a circular saw blade mounted on an output shaft of said motor;

a first shield fixed to said motor and covering an upper half of said circular saw blade as said saw blade rotates on said output shaft;

a handle fastened to said first shield for controlling the cutting operation of the workpiece held by said clamping mechanism;

a second shield having a pivoting hole and a connection point spaced away from said pivoting hole, said pivoting hole rotatably engaged on the output shaft of the motor;

a third shield having a pivoting hole and a connection point spaced away from said pivoting hole, said pivoting hole rotatably engaged on the output shaft of the motor;

said second shield and said third shield being rotatably secured on the output shaft of the motor by a retaining bolt;

a master connection rod fastened pivotally at one end thereof with said base at a second pivot, and at another end thereof with said connection point of said second shield, said master connection rod provided with a connection point; and a slave connection rod fastened pivotally at one end thereof with said connection point of said third shield, and at another end thereof with said connection point of said master connection rod;

wherein, said master connection rod and said slave connection rod rotatably retract said second shield and said third shield into said first shield when said circular saw blade is moved toward said base to cut the workpiece on said base and said master connection rod pivots around said second pivot.

2. The power saw as defined in claim 1, wherein said master connection rod is provided at one end thereof with a slide slot engaged to the second pivot mounted on said base to permit adjustment of a pivoting radius of said master connection rod.

3. The power saw as defined in claim 1, wherein said first shield is provided with a slot receiving therein said master connection rod so as to enable said second shield and said third shield to be retracted into said first shield.

4. The power saw as defined in claim 2, wherein said second pivot is spaced further from a workpiece support surface of said base than said first pivot.

5. The power saw as defined in claim 1, wherein said second shield and said third shield are rotatably extended from said first shield by said master connection rod and said slave connection rod at such time when said circular saw blade is moved away from said base and the workpiece held by said clamping mechanism.

* * * * *